United States Patent
Yang et al.

(10) Patent No.: US 12,149,078 B2
(45) Date of Patent: Nov. 19, 2024

(54) METHOD FOR INTELLIGENTLY ADJUSTING POWER FLOW BASED ON Q-LEARNING ALGORITHM

(71) Applicant: STATE GRID ZHEJIANG ELECTRIC POWER CO., LTD. TAIZHOU POWER SUPPLY COMPANY, Zhejiang (CN)

(72) Inventors: Jian Yang, Zhejiang (CN); Dongbo Zhang, Zhejiang (CN); Xinjian Chen, Zhejiang (CN); Yilun Zhu, Zhejiang (CN); Jie Yu, Zhejiang (CN); Daojian Hong, Zhejiang (CN); Zhouhong Wang, Zhejiang (CN); Chenghuai Hong, Zhejiang (CN); Zihuai Zheng, Zhejiang (CN); Huiying Gao, Zhejiang (CN); Minyan Xia, Zhejiang (CN); Bingren Wang, Zhejiang (CN); Guode Ying, Zhejiang (CN); Yizhi Zhu, Zhejiang (CN)

(73) Assignees: STATE GRID ZHEJIANG ELECTRIC POWER CO., LTD., Taizhou (CN); TAIZHOU POWER SUPPLY COMPANY, Taizhou (CN)

( * ) Notice: Subject to any disclaimer, the term of this patent is extended or adjusted under 35 U.S.C. 154(b) by 701 days.

(21) Appl. No.: 15/734,989

(22) PCT Filed: Oct. 11, 2020

(86) PCT No.: PCT/CN2020/120259
§ 371 (c)(1),
(2) Date: Dec. 3, 2020

(87) PCT Pub. No.: WO2021/093493
PCT Pub. Date: May 20, 2021

(65) Prior Publication Data
US 2021/0367426 A1 Nov. 25, 2021

(30) Foreign Application Priority Data
Nov. 16, 2019 (CN) .......................... 201911123269.8

(51) Int. Cl.
*G06N 20/00* (2019.01)
*G06Q 50/06* (2012.01)
*H02J 3/06* (2006.01)

(52) U.S. Cl.
CPC ................ *H02J 3/06* (2013.01); *G06N 20/00* (2019.01); *G06Q 50/06* (2013.01)

(58) Field of Classification Search
USPC ........................................................ 700/286
See application file for complete search history.

(56) References Cited

U.S. PATENT DOCUMENTS

2020/0119556 A1* 4/2020 Shi ........................... G06N 3/08

FOREIGN PATENT DOCUMENTS

| CN | 108321795 A | * | 7/2018 | ....... G06Q 10/06312 |
| CN | 109511277 A | | 3/2019 | |

OTHER PUBLICATIONS

Huang et al, over "Adaptive Power System Emergency Control using Deep Reinforcement Learning" arXiv:1903.03712v2 [cs.LG] Apr. 22, 2019 accessed at https://arxiv.org/abs/1903.03712 12 pgs. (Year: 2019).*

(Continued)

*Primary Examiner* — Emilio J Saavedra

(57) ABSTRACT

A method for intelligently adjusting a power flow based on a Q-learning algorithm includes: converting a variable, an action, and a goal in a power grid to a state, an action, and a reward in the algorithm, respectively; selecting an action from an action space, giving an immediate reward based on a result of power flow calculation, and correcting a next state; forwardly observing a next exploration action based on a strategy in the Q-learning algorithm; updating a Q value (Continued)

in a corresponding position in a Q-value table based on the obtained reward; if a final state is not reached, going back to step 2; otherwise, increasing the number of iterations by 1; if the number of iterations does not reach predetermined value K, that is, Episode<K, going back to step 2; otherwise, that is, Episode=K, outputting the Q-value table; and outputting an optimal unit combination.

2 Claims, 1 Drawing Sheet

(56) References Cited

OTHER PUBLICATIONS

Andra, "Reinforcement Learning Approach to Product Allocation and Storage" Masters Thesis, Northeastern University, May 2010, 61 Pgs (Year: 2010).*
Sutton et al., "Reinforcement Learning: An Introduction" 2nd ed MT Press, 2018, 548 Pgs., (Year: 2018).*
Li, "Deep Reinforcement Learning: An Overview" Nov. 26, 2018, 85 Pgs., accessed at https://arxiv.org/abs/1701.07274 (Year: 2018).*
Xibing Hu, The Research of Optimal Power Flow Based on Reainforcement Learning, Chinese Master's Theses Full- text Database, Engineering Science and Technology II, Dec. 15, 2011, pp. 1-19.

* cited by examiner

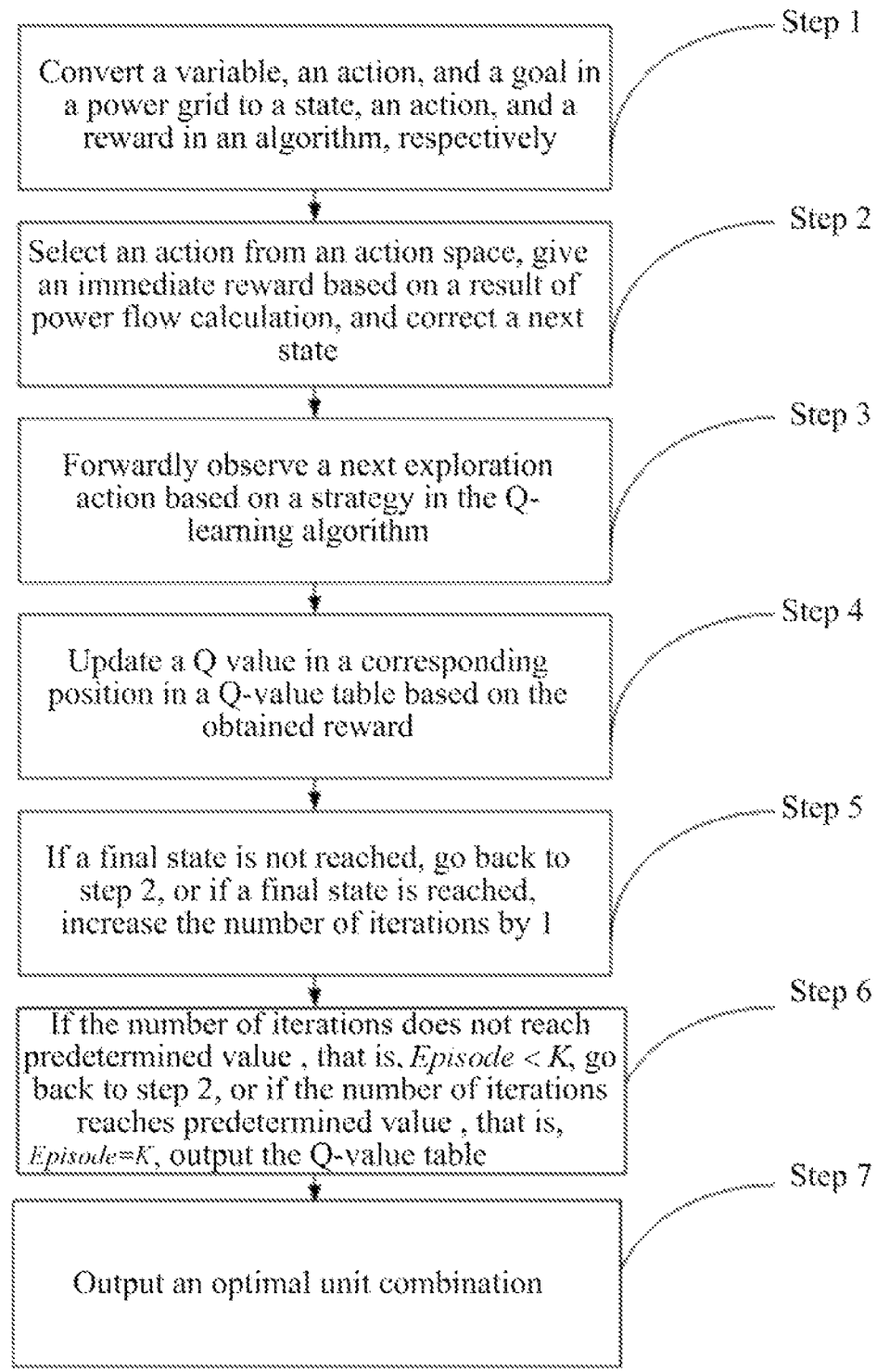

METHOD FOR INTELLIGENTLY ADJUSTING POWER FLOW BASED ON Q-LEARNING ALGORITHM

TECHNICAL FIELD

The present invention relates to the field of power adjustment, and in particular, to a method for intelligently adjusting a power flow based on a Q-learning algorithm.

BACKGROUND

At present, in order to adjust a power flow, an operator usually adjusts the adjustable load power output based on experience to adjust a non-convergent power flow to a convergent power flow. In this method, adjustment is manually conducted completely based on the experience of the operator. Therefore, the method is random, and is inefficient and ineffective. In addition, the method imposes extremely high theoretical and practical requirements for the operator.

SUMMARY

In view of this, the present invention provides a strategy for intelligently adjusting a power flow based on a Q-learning algorithm. Through continuous trying and rule learning, a best unit combination is selected, and a non-convergent power flow is adjusted to a convergent power flow. This minimizes the loss of a power grid, overcomes blindness of a conventional method relying on human experience, and improves efficiency and accuracy of power flow adjustment.

The present invention provides a method for intelligently adjusting a power flow based on a Q-learning algorithm. The method includes:
step 1: converting a variable, an action, and a goal in a network grid to a state, an action, and a reward in the algorithm, respectively;
step 2: selecting an action from an action space, giving an immediate reward based on a result of power flow calculation, and correcting a next state;
step 3: forwardly observing a next exploration action based on a strategy in the Q-learning algorithm;
step 4: updating a Q value in a corresponding position in a Q-value table based on the obtained reward;
step 5: if a final state is not reached, going back to step 2, or if a final state is reached, increasing the number of iterations by 1;
step 6: if the number of iterations does not reach predetermined value K, that is, Episode<K, going back to step 2, or if the number of iterations reaches predetermined value K, that is, Episode=K, outputting the Q-value table; and
step 7: outputting an optimal unit combination.

Optionally, the intelligent adjustment method includes:
establishing an expression of a state space representing a combination of states of all units, as shown in formula (1):

$$S=\{\text{Power output of unit 1, Power output of unit 2, ..., Power output of unit } N\} \quad (1),$$

where
S denotes the state space, and a value of N is a positive integer;
establishing an expression of an action space in which powering-on or powering-off of a unit is used as an action, as shown in formula (2):

$$A=\{\text{Powering on of unit 1, Powering off of unit 1, ..., Powering off of unit } N\} \quad (2),$$

where
A denotes the action space, and a value of N is a positive integer; and
reward design:
establishing expression R of a reward design for adjusting power flow from non-convergent to convergent and simultaneously minimizing a network loss of the power grid, as shown in formula (3):

$$R = \begin{cases} \text{A large penalty value (such as } -999\text{),} \\ \quad \text{non-convergent power flow;} \\ \text{A small penalty value (such as } -1\text{),} \\ \quad \text{power output of a balancing machine exceeds} \\ \quad \text{an upper or a lower limit;} \\ \text{A large reward value (such as 100), the goal} \\ \quad \text{is achieved;} \\ \text{A small reward value (such as 1), a network loss} \\ \quad \text{load percentage decreases} \\ 0, \text{ the network loss load percentage increases;} \end{cases} \quad (3)$$

Optionally, the intelligent adjustment method includes:
limiting values of parameters $\varepsilon$, $\alpha$, and $\gamma$ in the Q-learning algorithm, where:
$\varepsilon$ denotes a probability of an action selection in an $\varepsilon$-greedy strategy, and $\varepsilon$ is a positive number initially set to maximum value 1, and is gradually decreased as the number of iterations increases; $\alpha$ denotes a learning rate, and $0<\alpha<1$; and
$\gamma$ denotes a discount factor of an attenuation value of a future reward, and is set to a value close to 1.

The beneficial effects of the present invention include:

1) In a conventional method, manual adjustment is performed repeatedly based on human experience, which leads to a bad effect and low efficiency of power flow adjustment. The present invention resolves this problem and improves accuracy and efficiency of power flow adjustment.

2) In actual engineering, unit power output is usually fixed. A non-convergent power flow is adjusted to a convergent power flow by adjusting a unit combination, which delivers better practicability.

3) It is only necessary to convert performance indexes in the power grid to evaluation indexes in reinforcement learning based on actual needs. A reward in reinforcement learning may be given based on loss of the power grid, power output of a balancing machine, and balance of unit power output, etc. This allows the indexes to meet requirements, and improves flexibility of power flow adjustment.

BRIEF DESCRIPTION OF THE DRAWINGS

To describe the technical solutions in the embodiments of this application more clearly, the accompanying drawings required to describe the embodiments are briefly described below. Apparently, the accompanying drawings described below are only some embodiments of the present invention. A person of ordinary skill in the art may further obtain other accompanying drawings based on these accompanying drawings without creative effort.

FIG. 1 is a schematic flowchart of a method for adjusting a power flow based on a Q-learning algorithm according to an embodiment of this application.

DETAILED DESCRIPTION

The present invention is further described below with reference to the accompanying drawings.

A method for adjusting a power flow based on a Q-learning algorithm mainly includes the following seven steps:

1) State space design: In this specification, it is assumed that unit power output remains unchanged, and each unit has only two states: on and off, that is, unit power output is only initial power output or 0. Therefore, a state space is a combination of states of all units:

$$S=\{\text{Power output of unit 1, Power output of unit 2, ..., Power output of unit } N\} \quad (1),$$

where
S denotes the state space.

2) Action space design: Using powering-on or powering-off of a unit as an action, an action space is:

$$A=\{\text{Powering on of unit 1, Powering off of unit 1, ..., Powering off of unit } N\} \quad (2),$$

where
A denotes the action space.

When a certain state is reached, selecting a certain action may not change the state. For example, unit 1 is on. If the action "powering on unit 1" is selected, the state remains unchanged, and the action is meaningless. To reduce unnecessary repetition and save running time, each time a state is reached, an action corresponding to the unit state is removed from the action space. Remaining actions form an action subspace. An action is selected only from the action subspace.

3) Reward design: A reward function is particularly important in the Q-learning algorithm, which depends on a current state, an action just conducted, and a next state. Properly setting a reward helps faster make a better decision. An optimization objective of this specification is to adjust a non-convergent power flow to a convergent power flow while minimizing the loss of the power grid. Therefore, the reward may be set as follows:

$$R = \begin{cases} \text{A large penalty value (such as } -999\text{),} \\ \quad \text{non-convergent power flow;} \\ \text{A small penalty value (such as } -1\text{),} \\ \quad \text{power output of a balancing machine exceeds} \\ \quad \text{an upper or a lower limit;} \\ \text{A large reward value (such as 100), the goal} \\ \quad \text{is achieved;} \\ \text{A small reward value (such as 1), a network loss} \\ \quad \text{load percentage decreases} \\ 0, \text{ the network loss load percentage increases;} \end{cases} \quad (3)$$

4) Parameter design: In the Q-learning algorithm, the following three parameters have greater impact on the performance of the algorithm: $\varepsilon$, $\alpha$, and $\gamma$. Functions and settings of the three parameters are as follows:

(1) $\varepsilon$ ($0<\varepsilon<1$): It denotes a probability of an action selection in an $\varepsilon$-greedy strategy and is a positive number. An agent has a probability of $1-\varepsilon$ to select an action based on an optimal value in a Q-value table, and has a probability of $\varepsilon$ to randomly select an action, so that the agent can jump out of the local optimum. In addition, all values in the Q-value table are initially 0, which requires a lot of exploration through random action selection. Therefore, $\varepsilon$ is initially set to maximum value 1, and is gradually decreased as the number of iterations increases.

(2) Learning rate $\alpha$ ($0<\alpha<1$): A larger value of $\alpha$ indicates that less previous training effects are retained. Therefore, it is usually set to a small value.

(3) Discount factor $\gamma$ ($0<\gamma<1$): It denotes an attenuation value of a future reward. A larger value of $\gamma$ indicates that past experience is more valued. A smaller value of $\gamma$ indicates that only a reward from a current action is considered. Therefore, $\gamma$ is usually set to a value close to 1.

For a power system including N units, a procedure of adjusting a power flow based on a Q-learning algorithm is shown in FIG. 1.

Step 1: Convert a variable, an action, and a goal in the power grid to a state, an action, and a reward in the algorithm, respectively. A reward function may be given based on a result of power flow calculation and formula (3) by using active power output of a unit as the state and powering-on or powering-off of the unit as the action. An initial state may be read.

Step 2: Select an action from the action space based on the $\varepsilon$-greedy strategy. Number r may be randomly selected from range [0,1]. If $r<\varepsilon$, an action may be randomly selected from the action space. Otherwise, an action may be selected based on an optimal value in a current state in the Q-value table.

Step 3: Conduct power flow calculation, obtain an immediate reward based on formula (3), and correct the state S=S'.

Step 4: Update a Q value based on the obtained immediate reward:

$$Q = (1-\alpha)*Q(S,A) + \alpha\left[R + \gamma*\max_a Q(S',a)\right], \quad (4)$$

where
R denotes the immediate reward, $$\max_a Q(S',a)$$

denotes an optimal value of all actions a in the next state S' in a previous learning process, $\alpha$ denotes the learning rate, $\gamma$ denotes the discount factor, and Q(S, A) denotes a Q value in the current state in the Q-value table.

Step 5: Determine whether S' is a final state; and if no, go back to step 2, or if yes, increase the number of iterations by 1: Episode=Episode+1.

Step 6: Determine whether the number of iterations reaches predetermined value K. If yes, Episode=K, and the Q-value table is updated. If no Episode<K, and go back to step 2 for a next round of learning.

Step 7: Obtain an optimal unit combination, which is the current state.

Through continuous trying and rule learning, the best unit combination may be selected, and a non-convergent power flow may be adjusted to a convergent power flow. This may minimize the loss of the power grid, overcome blindness of a conventional method relying on human experience, and improve efficiency and accuracy of power flow adjustment.

In the strategy, the variable, action, and goal in the power grid are converted to the state, action, and reward in the algorithm by using the Q-learning method based on a reinforcement learning theory. The unit output remains unchanged. The best unit combination is selected. The non-convergent power flow is adjusted to the convergent power flow. In addition, the loss of the power grid is minimized, and the efficiency and accuracy of power flow adjustment are improved.

TABLE 1

Comparison of indexes before and after adjustment

| Index | Before adjustment | After adjustment |
|---|---|---|
| Whether a power flow is convergent | No | Yes |
| Network loss (MW) | / | 51.1344. |
| Network loss load percentage (%) | / | 0.49 |

First, in the strategy, the variable, action, and goal in the power grid are converted to the state, action, and reward in the algorithm by using the Q-learning algorithm based on the reinforcement learning theory, which delivers great flexibility.

Secondly, unit power output is usually fixed in actual projects, and only a combination of powered-on units is adjusted. In this specification, the best combination of powered-on units is selected by powering on or off units without adjusting the unit power output. This delivers strong practicability.

Finally, power flow adjustment is conducted for the IEEE 39-bus standard test system and a certain actually operating system.

The content described in the embodiments of this specification is merely an enumeration of the implementations of the inventive concept, and the claimed scope of the present invention should not be construed as being limited to the specific forms stated in the embodiments. Equivalent technical means that come into the minds of a person skilled in the art in accordance with the inventive concept also fall within the claimed scope of the present invention.

What is claimed is:

1. A method for intelligently adjusting a power flow based on a Q-learning algorithm, comprising:
   step 1: converting a variable, an action, and a goal in a power grid to a state, an action, and a reward in the algorithm, respectively;
   step 2: selecting an action from an action space, giving an immediate reward based on a result of power flow calculation, and correcting a next state;
   step 3: forwardly observing a next exploration action based on a strategy in the Q-learning algorithm;
   step 4: updating a Q value in a corresponding position in a Q-value table based on the obtained reward;
   step 5: if a final state is not reached, going back to step 2, or if a final state is reached, increasing the number of iterations by 1;
   step 6: if the number of iterations does not reach predetermined value K, that is, Episode<K, going back to step 2, or if the number of iterations reaches predetermined value K, that is, Episode=K, outputting the Q-value table; and
   step 7: outputting an optimal unit combination, and adjusting power flow for an IEEE 39-bus standard test system and an actually-operating power system based on the optimal unit combination;
   wherein the step 1 comprises:
   using active power output of each generation unit as the state and establishing an expression of a state space representing a combination of states of all generation units, as shown in formula (1):

$S=\{$Power output of generation unit 1,Power output of generation unit 2, . . . ,Power output of generation unit $N\}$ (1), wherein
   S denotes the state space, and a value of N is a positive integer, and power output of each generation unit is a respective initial power output or 0;
   establishing an expression of an action space in which powering-on or powering-off of each generation unit is used as the action, as shown in formula (2):

$A=\{$Powering on of generation unit 1,Powering off of generation unit 1, . . . ,Powering off of generation unit $N\}$ (2), wherein
   A denotes the action space, and a value of N is a positive integer, and wherein when each generation unit reaches a power-on state or a power-off state, an action corresponding to the state of the generation unit is removed from the action space; and
   reward design: establishing expression R of a reward design for adjusting power flow from non-convergent to convergent and simultaneously minimizing a network loss of the power grid, as shown in formula (3):

$$R = \begin{cases} -999, \text{ when a non-convergent} \\ \quad\quad\quad \text{power flow occurs} \\ -1, \text{ when power output of a balancing machine} \\ \quad\quad \text{exceeds an upper or a lower limit} \\ 100, \text{ when the goal is achieved} \\ 1, \text{ when a network loss load percentage decreases} \\ 0, \text{ when the network loss load percentage increases.} \end{cases}$$ (3)

2. The method for intelligently adjusting a power flow based on a Q-learning algorithm according to claim 1, further comprising:
   Limiting values of parameters, ε, α, and γ in the Q-learning algorithm, wherein:
   ε denotes a probability of an action selection in an ε-greedy strategy, and ε is a positive number initially set to maximum value 1, and is gradually decreased as the number of iterations increases; α denotes a learning rate, and $0<\alpha<1$; and
   γ denotes a discount factor of an attenuation value of a future reward, and is set to a value close to 1.

* * * * *

UNITED STATES PATENT AND TRADEMARK OFFICE
CERTIFICATE OF CORRECTION

PATENT NO. : 12,149,078 B2  
APPLICATION NO. : 15/734989  
DATED : November 19, 2024  
INVENTOR(S) : Jian Yang et al.

Page 1 of 1

It is certified that error appears in the above-identified patent and that said Letters Patent is hereby corrected as shown below:

On the Title Page

In Item (73) Assignees data, the correct data of the assignee should be "STATE GRID ZHEJIANG ELECTRIC POWER CO., LTD. TAIZHOU POWER SUPPLY COMPANY, Taizhou (CN)".

Signed and Sealed this  
Fourth Day of February, 2025

Coke Morgan Stewart  
*Acting Director of the United States Patent and Trademark Office*